Oct. 18, 1966    R. GEBEL    3,280,350
MAGNETOHYDRODYNAMIC GENERATOR
Filed Oct. 29, 1964    2 Sheets-Sheet 1

INVENTOR
Rudolf Gebel

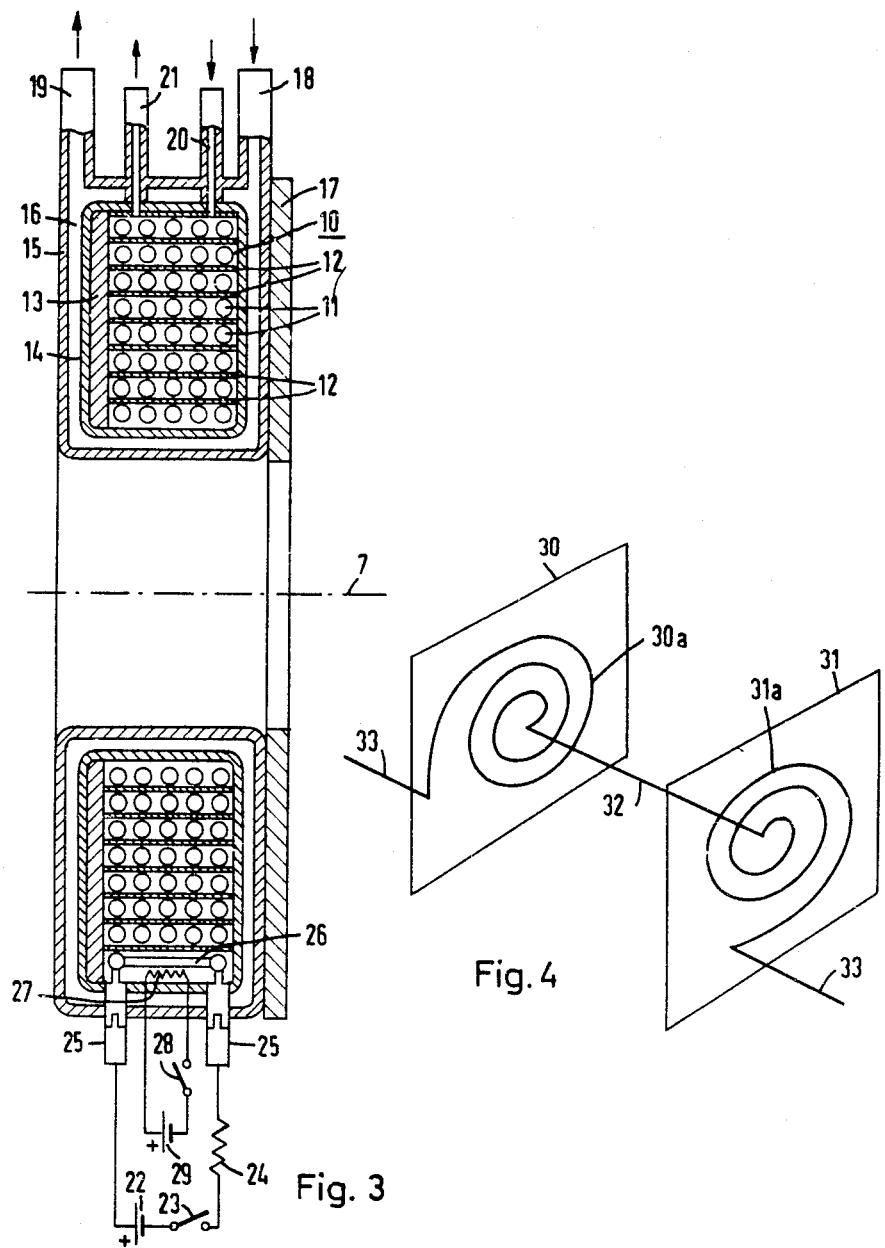

3,280,350
MAGNETOHYDRODYNAMIC GENERATOR

Rudolf Gebel, Erlangen, Germany, assignor to Siemens-Schuckertwerke Aktiengesellschaft, Berlin-Siemensstadt, Germany, a corporation of Germany
Filed Oct. 29, 1964, Ser. No. 407,505
Claims priority, application Germany, Oct. 30, 1963, S 88,092
1 Claim. (Cl. 310—11)

My invention relates to a magnetohydrodynamic generator also known as a magnetoplasmadynamic generator and hereinafter referred to as an MHD generator.

In an MHD generator an electrically conductive medium of relatively high velocity is generally passed between a pair of electrodes. When a magnetic field is applied perpendicularly to the plasma flow direction and to an imaginary plane passing through the electrodes, electric power can be drawn from the electrodes. If one of the determining or relevant parameter values for producing the current is periodically varied, an alternating current can then be produced. With constant parametric values, direct current is obtained.

The electrically conducting medium can be an ionized gas of combustion products or can be obtained by radiation and heat of radioactive processes. Through the addition of slightly ionizable materials (seed material) the gas can be given the characteristics of a plasma.

The electrodes can be located in a channel of an MHD generator of the type such as is shown and described in the publication "Power" of November 1959, beginning on page 62 thereof. An MHD generator of more compact construction can be obtained moreover by employing a channel with a pair of coaxial cylindrical walls and by having the plasma flow in a helical path. It has been known to provide an MHD generator of this type with wire coils wound around the outer cylinder for producing an axial magnetic field in the flow space, however, this means of producing the magnetic field is disadvantageous in that the space of the inner cylinder is permeated with stray or scattered force lines which are unable to contribute to the generator power. This disadvantage is particularly significant if, as with the employment of superconductive magnetic coils, the magnetic flux is unable to be passed through iron cores.

It is accordingly an object of my invention to provide an MHD generator which will avoid the disadvantages of the aforementioned known generators and will utilize to the fullest extent the applied magnetic field for generating a maximum supply of electrical power.

To this end and in accordance with my invention, I provide an improved MHD generator through which an electrically conducting medium flows in a helical path through a magnetic field. Magnetic windings are located concentrically to the axis of the helical path sandwiching the flow chamber between by respectively abutting both of the end faces thereof for producing a radially directed magnetic field. Scattered magnetic force lines between the magnet windings and the flow space 1 of the generator channel are thereby greatly avoided. This is essential for employing non-ferrous coils of superconductive materials for producing strong magnetic fields efficiently.

Other features which are considered as characteristic for the invention are set forth in the appended claim.

Although the invention has been illustrated and described as embodied in a magnetohydrodynamic generator, it is nevertheless not intended to be limited to the details shown, since various modifications and structural changes may be made therein without departing from the spirit of the invention and within the scope and range of equivalents of the claim.

The construction and method of operation of the invention, however, together with additional objects and advantages thereof, will be best understood from the following description of specific embodiments when read in connection with the accompanying drawings, in which:

FIG. 3 is a partly schematic longitudinal cross section of a superconductive coil which can be substituted for example for the left-hand coil of FIG. 1; and FIG. 4 is a diagrammatic view showing a manner of winding the coil of FIG. 3.

Figure 1:
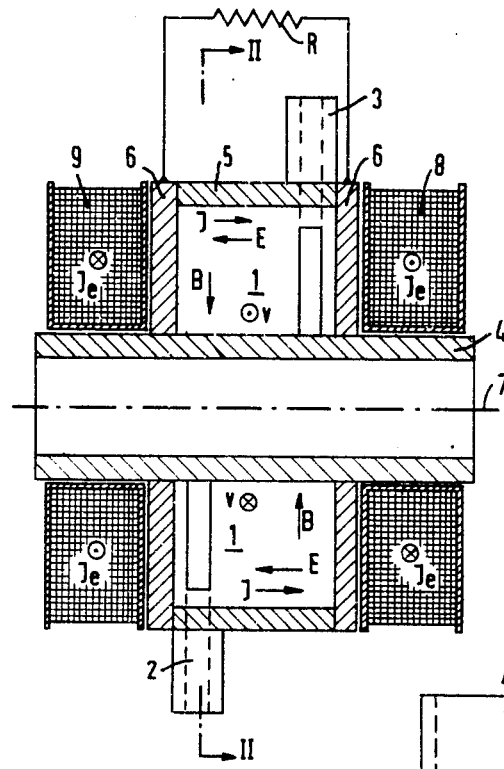
FIG. 1 is a longitudinal cross section of the MHD generator constructed in accordance with my invention shown partly schematically.
Figure 2:
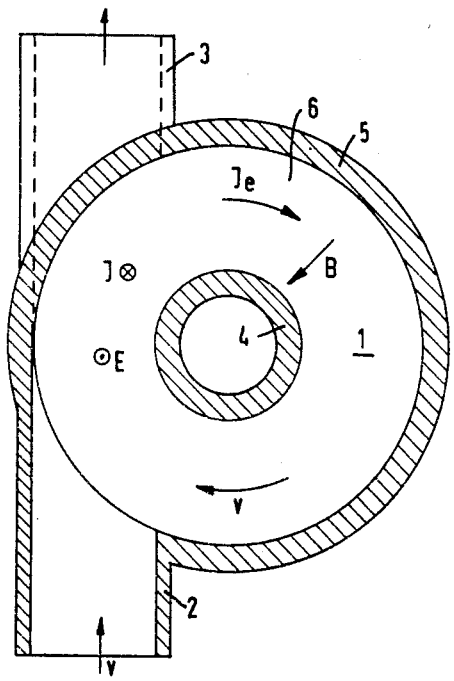
FIG. 2 is a transverse section of FIG. 1 taken along the line II—II in the direction of the arrows.

Referring now to the drawings and particularly to FIG. 1 thereof, there is shown a flow space 1 of a cylindrical annular generator channel into which plasma having a velocity $v$ of the order of magnitude of about 1000 meters per second and having a temperature of about 3000° C. is introduced through a supply tube 2 of, for example, rectangular cross section. The plasma traverses the flow space in a helical path in the direction $v$ and discharges from the flow space through a tube 3 of rectangular section for example, in the direction of the arrow related thereto as shown in FIG. 1. The generator channel is defined by coaxial cylindrical walls 4 and 5 and two annular electrodes 6 forming end walls of the flow space or chamber 1. The electrodes 6 are insulated from one another by means of electrically insulating cement layers (not shown) or by means of the walls 4 and 5 formed of non-conducting and non-magnetic material, such as ceramic for example. Annular electromagnet windings 8 and 9 concentric to the axis 7 of the helical path are mounted on end portions of the cylinder 4 and adjacent the electrodes 6 at both end faces of the channel or flow chamber. The electromagnet windings 8 and 9 are wound about the axis 7 of the helix and are made of superconductive materials. The electromagnet windings are excited or energized by currents $I_e$ flowing in the direction of the arrow, as shown in FIG. 2. The magnetic field B thus produced from this current flow acts in the direction indicated by the associated arrow. The magnetic fields of both coils are flattened in the flow space to such an extent that a largely homogeneous magnetic field develops in the flow space. This is achieved by counterwinding the coils when the same pole arrangement of the magnetic windings is employed or by winding the coils in the same direction when the coils are connected to opposite poles.

The plasma flow $v$ and the magnetic field B induce in the plasma an axial current flow in the direction of the arrow I whereby a field E in the opposing direction arises between the electrodes 6. Electric power is conducted to a load resistance R serially connected with both electrodes 6.

The superconductive coil shown in FIG. 3 comprises a winding 10 of a material such as niobium-zirconium wire arranged in winding layers 11. Slotted metal foils 12, of copper for example are placed between the winding layers 11 so that they extend in the axial direction 7. Consequently, the foils 12 constitute connecting members whose resistivity is high with superconductive exciting coils; however, after transition of individual coil windings to normal conductivity, the resistivity of the connecting pieces is so small with respect to these windings that these windings are shorted or bridged over. The simultaneous conversion from superconductive to normally conductive conditions for the exciter coil is thereby achieved. A short-circuiting or shunt ring 13 of copper or steel is provided laterally adjacent the exciter coil so as to absorb field energy inductively freed during the transition through short-circuiting currents. The exciter winding 10 and the shunt ring 13 are encased by a cryostat having the inner and outer housing shells 14 and 15 between which a cooling space 16 is located on all sides. The annular housing wall 15 can be constructed of materials like ceramics. In addition, a radiation shielding ring 17, for example of asbestos fiber-glass webbing, can be located at the side of the winding which is placed adjacent to the generator channel 1. Cooling media can be passed in the direction of the arrows through coolant inlet and outlet tubes 18, 20 and 19, 21, respectively. Through the tubes 18 and 19, the cooling chamber 16 is supplied for example with water, and through the tubes 20 and 21, the exciter winding 10 can be directly cooled by a coolant such as liquid helium. For the latter purpose, the wedge-shaped spaces that are formed between the windings of the exciter coil 10 can be simply traversed by the helium.

A voltage source 22 is used to excite the winding 10 and, as shown in FIG. 3, is connected with the exciter winding 10 by means of a switch 23 and a current limiting resistance 24 through the connecting plugs 25. The terminals for the exciter winding 10 are connected by a shunt 26 of superconductive material. A heating coil 27 is located adjacent the shunt 26 and is energized by the voltage source 29 when the switch 28 is closed.

In order to excite the winding 10, cooling and heating must be so adjusted that the exciter winding is superconductive while the shunt 26 is heated by the heating coil 27 and is not superconductive. When the switch 23 is closed, an excitation current builds up through the voltage source 22 and the winding 10. The heating of the shunt 26 is then stopped by opening the switch 28 whereupon the shunt 26 also becomes superconductive and the winding 10 is automatically short-circuited. Thereafter, the voltage source 22 can be switched off by opening the switch 23. By pulling out the plugs 25 no heat can then be conveyed over the terminal lead.

FIG. 4 diagrammatically illustrates a manner of winding the exciter winding 10 whereby the terminal locations 33 extend to the outside in a simple manner. Winding helices or spirals that have been spread apart are shown in the planes 30 and 31. The windings 30a and 31a thus represented are interconnected through the conductor 32. Additional spiral or helical windings can be connected through the terminals 33.

I claim:

MHD generator comprising an elongated cylindrical member, a narrow cylindrical member coaxially surrounding and spaced from an intermediate portion of said elongated cylindrical member, annular electrode plates mounted on said elongated cylindrical member on opposite sides of said narrow cylindrical member and defining an annular flow chamber therewith and with said intermediate portion of said elongated cylindrical member for the passage of ionized gaseous medium in a helical path about an axis, inlet and outlet means formed in said narrow cylindrical member for respectively supplying the ionized gaseous medium to said flow chamber and discharging the medium from said chamber, said inlet and outlet means comprising a pair of tubular members of substantially rectangular cross section extending substantially tangential to said narrow cylindrical member and respectively adjacent each of said annular electrode plates, and a pair of annular electromagnetic windings mounted respectively on opposite end portions of said elongated cylindrical member outside said flow chamber, said windings being adjacent respectively to said electrode plates and coaxial with said helical path, and means for energizing said electromagnet windings so as to produce in said flow chamber a magnetic field extending substantially radially to said axis.

References Cited by the Examiner

UNITED STATES PATENTS 2,716,943 9/1955 Vandenberg _____ 310—11 X
3,187,236 6/1965 Leslie _____ 317—158

OTHER REFERENCES

Book: High Magnetic Felds, published by M.I.T. Press, Cambridge, Massachusetts and John Wiley & Sons, New York and London; pp. 144 and 145.

MILTON O. HIRSHFIELD, Primary Examiner.

DAVID X. SLINEY, Examiner.